United States Patent Office 3,459,854
Patented Aug. 5, 1969

3,459,854
TETRACYCLINE CYCLOHEXYL SULPHAMATE AND PROCESS FOR PREPARATION
Jacques Robert Boissier, Paris, and Georges Andre Combes, Versailles, France, assignors to Societe anonyme dite: Societe Industrielle pour la Fabrication des Antibiotiques (S.I.F.A.), Paris, France, a French company
No Drawing. Original application Jan. 13, 1964, Ser. No. 337,138, now Patent No. 3,299,124, dated Jan. 17, 1967. Divided and this application June 9, 1966, Ser. No. 574,840
Int. Cl. A61k 21/00; C07c 103/19
U.S. Cl. 424—128                5 Claims

ABSTRACT OF THE DISCLOSURE

A pharmaceutical composition comprising the cyclohexyl sulphamate salt of tetracycline and a pharmaceutical excipient, said composition being useful as an antimicrobial agent and having a substantially less disagreeable taste than the base, tetracycline.

This application is a division of our co-pending U.S. application Serial No. 337,138, filed January 13, 1964 and now U.S. Patent No. 3,299,124.

This invention relates to a new tetracycline derivative, namely tetracycline cyclohexyl sulphamate, a process for the preparing thereof, and to pharmaceutical preparations containing this new derivative which is extremely useful in connection with human therapeutics.

Tetracycline is an antibiotic which has been known for several years and which is very widely used in human medicine, because of its remarkable antimicrobial properties and because it is active towards a very large number of germs which are pathogenic for human beings.

Tetracycline has in addition the important advantage, in contrast to numerous other antibiotics, of being active by buccal administration and consequently capable of being easily administered to patients. The majority of pharmaceutical compositions which are based on tetracycline are thus intended for oral administration; tetracycline is generally used in the form of the base, or the hydrochloride.

In these two states and more generally in the form of derivatives known at the present time, tetracycline has a bitter taste and a rather unpleasant flavour, which it has been attempted to mask by means of various excipients and flavouring substances which are added to the pharmaceutical compositions, such as flavoured powders, drinkable solutions and syrups. Attempts have also been made to mask the taste of tetracycline and its derivatives by using capsules or by preparing compressed tablets, which are then coated with sugar.

The use of such compositons on an industrial scale is a complex matter; moreover, it is very advantageous to be able to have available a tetracycline derivative which, while retaining the antimicrobial activity of tetracycline, does not have the disagreeable taste thereof.

The present invention provides a new tetracycline derivative namely tetracycline cyclohexyl sulphamate which has these two properties.

This new derivative can be prepared by reacting cyclohexyl sulphamic acid with tetracycline base in organic liquid medium which is inert towards the starting products, and isolating the tetracycline cyclohexyl sulphamate formed.

In one preferred method of carrying out this process cyclohexyl sulphamic acid is reacted in solution in an alcohol of low molecular weight, either on the tetracycline base in solution in the same solvent, (in which case it is advantageous to work with substantially stoichiometric quantites of the starting products dissolved in tepid ethyl alcohol), or on the tetracycline base in suspension in acetone. It is then possible to precipitate the tetracycline cyclohexyl sulphamate formed by adding ethyl or isopropyl ether and drying the product which is obtained in vacuo, if desired with the aid of a substance which absorbs the water vapour, such as phosphorus pentoxide.

Tetracycline cyclohexyl sulphamate has the following empirical formula:

 (molecular weight 623.67)

and the following molecular formula:

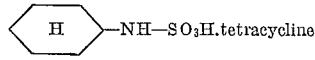

in which the word "tetracycline" represents a molecule of tetracycline, according to the formula which appears for example in U.S.P. XVI, page 745.

Tetracycline cyclohexyl sulphamate is obtained in the form of a light yellow powder which is very soluble in water (pH of the aqueous solution at 5%=2.5). It has no pronounced bitter taste unlike tetracycline itself, and on the other hand has a very marked surgary taste. Upon heating, it is decomposed at about 220° C.

The $LD_{50}$ of this new derivative, administered intravenously to mice, is about 365 mg./kg. It is known that under the same conditions, the $LD_{50}$ of tetracycline hydrochloride is about 230 mg./kg. These results reduced to the quantity of the tetracycline base, are 256 mg./kg. and 210 mg./kg., respectively. Furthermore, the new derivative, when administered to the same animal perorally, in a dose of 5 g./kg., does not cause death.

Tetracycline cyclohexyl sulphamate was administered perorally to dogs; blood flows which were obtained after 30 minutes, 1 hour, 3 hours, 6 hours and 24 hours have been found to be far superior to those obtained by the ingestion of an equivalent quantity of tetracycline.

Because of its remarkable properties, the new derivative according to the invention consitutes an anti-biotic which is very useful in human therapeutics for the treatment of illnesses caused by pathogenic germs sensitive to tetracycline.

As a medicament, it may be used as the active principle of solid or liquid pharmaceutical compositions intended for administration by the usual means, but intended more particularly for oral administration or for the treatment of the buccal cavity. Various excipients generally employed in preparations may be used for example talc, starch, magnesium stearate, hexoses, acqueous or non-aqueous vehicles and emulsifiers.

The pharmaceutical compositions may be of various types, but in addition to the forms suitable for medicaments administered perorally, such as compressed tablets, syrups and powders, the new derivative according to the invention can be used easily in pharmaceutical forms adapted to the local antibiotic treatment of the buccal cavity, which forms have hitherto been difficult to obtain because of the bad taste of the tetracycline. This is the reason why tetracycline cyclohexyl sulphamate is of very great utility for the preparation of such forms as lozenges, pastilles, gum, aerosols, liquids for gargles and mouthwashes, when it is desired to treat by means of the latter, affections caused by germs which are sensitive to tetracycline.

Tetracycline cyclohexyl sulphamate can be associated in the medicament compositions with various substances, provided that they are parmaceutically compatible. These substances can comprise other active principles and/or ordinary excipients, but it has been found that its association with an alkali metal hexametaphosphate is particularly favorable.

The hexametaphosphate employed is preferably sodium hexametaphosphate. The proportions of tetracycline cyclohexyl sulphamate and hexametaphosphate can vary within very wide limits, but it is preferred to use the compositions in which three parts of tetracycline cyclohexyl sulphamate are associated with approximately two parts of sodium hexametaphosphate.

The associations of tetracycline cyclohexylsulphamate with alkali hexametaphosphate, administered by the digestive tract, permit to obtain very much higher antibiotic levels in the blood than the administration of the antibiotic alone. For example, during overlapping tests on six dogs, there were administered by way of gastric intubation 64 mg./kg. of tetracycline cyclohexyl sulphamate, on the one hand, and this same dose of the tetracycline derivative associated with 40 mg./kg. of sodium hexametaphosphate, on the other hand; it was established that the blood rates obtained with the mixture were higher by about 50% than those recorded with the new derivative by itself. The results obtained (average of 6 animals) are set out in the following table.

The counts were established by the method of dilution in agar medium, the dosage standard being the tetracycline cyclohexyl sulphamate employed.

CONCENTRATION IN MCG./ML. OF PLASMA

[Average on 6 animals]

| Product | Dose administered, mg./kg. | Hours of sampling | | | | | |
|---|---|---|---|---|---|---|---|
| | | 0 | ½ | 1 | 3 | 6 | 24 |
| Tetracycline cyclohexyl sulphamate | 64 | <1.2 | 8.0 | 10.2 | 9.7 | 7.8 | <1.2 |
| Tetracycline cyclohexyl sulphamate plus | 64 | <1.2 | 10.8 | 14.3 | 13.4 | 9.8 | <1.4 |
| Sodium hexametaphosphate | 40 | | | | | | |

The pharmaceutical compositions providing the above association are particularly useful when it is desired to have available a treatment by way of the digestive tract; they are then preferably constituted by forms comprising simple or sugar-coated compressed tablets, syrups, drinkable solutions, granulated compositions and capsules. They are generally administered, to an adult, in doses which correspond to the consumption of 0.500 g. to 3 g. per day of tetracycline cyclohexyl sulphamate.

The following non-limiting examples illustrate the invention:

EXAMPLE 1

10 g. of tetracycline base were dissolved in 90 cc. of absolute ethanol at a temperature of 45° C. 4.03 g. of cyclohexyl sulphamic acid dissolved in 40 cc. of absolute ethanol were added to the solution obtained. The mixture was allowed to cool to ambient temperature. The solution was then poured, while stirring, into 5 times its volume of ethyl ether. The precipitate which formed was dried, washed with ethyl ether and dried in vacuo. 9.5 g. (68%) of tetracycline cyclohexyl sulphamate were obtained.

Calculated: S, 5.12%; N, 6.72%. Found: S, 5.01%; N, 6.46%.

The product was obtained in the form of a light yellow powder which was very soluble in water.

Biological titre (established with respect to tetracycline hydrochloride): theoretical, 770 mcg/mg. Found: turbidimetric method, 720 mcg/mg.; diffusion method, 685 mcg/mg.

EXAMPLE 2

10 g. of tetracycline base were suspended in the cold in 30 cc. of acetone and a solution of 3.8 g. of cyclohexyl sulphamic acid in 30 cc. of ethanol was added to the suspension.

Finally, separation by filtration is carried out in order to remove the slight excess of tetracycline base and the filtrate was poured into ethyl ether. The precipitate which formed was filtered, washed and dried and there were obtained 12.40 g. (90%) of tetracycline cyclohexyl sulphamate.

EXAMPLE 3

Compressed tablets were produced which corresponded to the following composition: tetracycline cyclohexyl sulphamate, 250 mg.; excipient, sufficient to make 1 compressed tablet comprising 400 mg.

EXAMPLE 4

Lozenges were produced which corresponded to the following composition; tetracycline cyclohexyl sulphamate, 20 mg.; excipient, sufficient to make 1 completed lonzenge of 1 g.

EXAMPLE 5

Sugar-coated compressed tablets were prepared which corresponded to the following composition:

| | Mg. |
|---|---|
| Tetracycline cyclohexyl sulphamate | 250 |
| Sodium hexametaphosphate | 160 |
| Excipient, sufficient to make one sugar-coated compressed tablet. | |

We claim:

1. A pharmaceutical composition comprising the cyclohexyl sulphamate salt of tetracycline and a pharmaceutical excipient.

2. A pharmaceutical composition as claimed in claim 1, wherein the pharmaceutical excipient is a solid.

3. A pharmaceutical composition comprising tetracycline cyclohexyl sulphamate, an alkali metal hexametaphosphate and a pharmaceutical excipient.

4. A pharmaceutical composition as claimed in claim 3, wherein the alkali metal hexametaphosphate is sodium hexametaphosphate.

5. A pharmaceutical composition comprising the cyclohexyl sulphamate salt of tetracycline and a liquid pharmaceutical excipient.

References Cited

UNITED STATES PATENTS

| 2,795,528 | 6/1957 | Buckwalter et al. | 167—55 |
| 3,138,529 | 6/1964 | Takesue et al. | 167—65 |
| 3,155,587 | 11/1964 | Reed et al. | 167—65 |

ALBERT T. MEYERS, Primary Examiner

DAREN M. STEPHENS, Assistant Examiner

U.S. Cl. X.R.

260—559; 424—227